(12) United States Patent
Hageneder (10) Patent No.: US 9,981,885 B2
(45) Date of Patent: May 29, 2018

(54) DEVICE FOR PRODUCING HUMUS (71) Applicant: Willibald Hageneder, Pettenbach (AT)

(72) Inventor: Willibald Hageneder, Pettenbach (AT)

( * ) Notice: Subject to any disclaimer, the term of this patent is extended or adjusted under 35 U.S.C. 154(b) by 220 days.

(21) Appl. No.: 14/891,748

(22) PCT Filed: Apr. 24, 2014

(86) PCT No.: PCT/AT2014/050103
§ 371 (c)(1),
(2) Date: Nov. 17, 2015

(87) PCT Pub. No.: WO2014/190364
PCT Pub. Date: Dec. 4, 2014

(65) Prior Publication Data
US 2016/0289132 A1 Oct. 6, 2016

(30) Foreign Application Priority Data
May 28, 2013 (AT) .............................. A 50361/2013

(51) Int. Cl.
C05F 17/00 (2006.01)
C05F 17/02 (2006.01)
C05F 11/06 (2006.01)

(52) U.S. Cl.
CPC .......... C05F 17/0258 (2013.01); C05F 11/06 (2013.01); C05F 17/0205 (2013.01); C05F 17/0276 (2013.01); Y02P 20/145 (2015.11); Y02W 30/43 (2015.05)

(58) Field of Classification Search
CPC .............. C05F 17/0205; C05F 17/0258; C05F 17/0276
See application file for complete search history.

(56) References Cited

U.S. PATENT DOCUMENTS

| 5,192,428 A | 3/1993 | Lindstrom |
| 5,432,088 A | 7/1995 | Kakuk et al. |
| 2011/0084070 A1* | 4/2011 | Martheenal ........ B65D 43/0222 220/200 |

FOREIGN PATENT DOCUMENTS

| AT | 402 752 B | 8/1997 |
| DE | 32 25 335 A1 | 1/1984 |
| DE | 88 15 400 U1 | 3/1989 |
| DE | 40 08 104 A1 | 9/1991 |
| DE | 196 02 023 C1 | 2/1997 |
| EP | 0 501 028 A1 | 9/1992 |

(Continued)

OTHER PUBLICATIONS

English language machine translation of WO 93/04999 (Sep. 5, 2017), pp. 1-8.*

(Continued)

*Primary Examiner* — William H. Beisner
(74) *Attorney, Agent, or Firm* — Collard & Roe, P.C.

(57) ABSTRACT

A device is described for producing humus, in particular a composter, having a compost container (1) forming a jacket, which is closed on top using a cover (2), wherein the cover (2) forms a rainwater collecting basin (3), with which at least one drain (5) opening into the composter interior (4) is associated. To achieve advantageous climate conditions in the composter container, it is proposed that the drain (5) open into a collection container (6) associated with the jacket.

13 Claims, 8 Drawing Sheets

(56) References Cited

FOREIGN PATENT DOCUMENTS

GB        2 440 527 A     2/2008
WO     93/04999 A1    3/1993

OTHER PUBLICATIONS

English language machine translation of EP 0501028 (Sep. 5, 2017), pp. 1-5.*
International Search Report of PCT/AT2014/050103, dated Oct. 9, 2014.
"KOMPOST natuerlich gut! CTWFW deutsches Prospekt Web 2012," Container Trading WFW GmbH, Nov. 2012, XP-002729611, total of 5 pages.
"Montage Anleitung Thermo-Komposter KOMP 525 and KOMP 700," Container Trading WFW GmbH, 2012, XP-055139664, total of 2 pages. (Assembly Instructions).
"Montage Anleitung Thermo-Komposter KOMP 340 and KOMP 450," Container Trading WFW GmbH, 2012, XP-055139666, total of 2 pages (Assembly Instructions).

* cited by examiner

DEVICE FOR PRODUCING HUMUS

CROSS REFERENCE TO RELATED APPLICATIONS

This application is the National Stage of PCT/AT2014/050103 filed on Apr. 24, 2014, which claims priority under 35 U.S.C. § 119 of Austrian Application No. A 50361/2013 filed on May 28, 2013, the disclosure of which is incorporated by reference. The international application under PCT article 21(2) was not published in English.

1. FIELD OF THE INVENTION

The invention relates to a device for producing humus, in particular a composter, having a compost container forming a jacket, which is closed on top using a cover, wherein the cover forms a rainwater collecting basin, with which at least one drain opening into the composter interior is associated.

2. DESCRIPTION OF THE PRIOR ART

Such a device is known from U.S. Pat. No. 5,432,088 A. A component set for such a composter is known, for example, from AT 402 752 B. This component set comprises panels, which have a rectangular, in particular square basic shape and are connectable to further elements, which are attachable via a connecting elements on their edges, to form larger units, wherein at least edge sides of the panels opposing in pairs are provided with opposing holders for the connecting elements. Each panel has integrally formed sleeve sections, which are arranged ranged on two opposing sides offset in relation to one another spaced apart in parallel to the side edge, and which, upon attachment of a following panel in the aligned position, accommodate connecting bolts or tubes which protrude between the sleeve sections on the adjoining side of this panel continuously over two sleeve sections in each case, wherein the other two panel edges are provided with support flanges, which can be put one on top of another, and the panels having the sleeve sections and flanges are integrally produced from a plastic material, in particular from recycled and foamed old polyethylene material. Any desired composter cross sections may be reproduced using such wall elements, in particular triangular, square, polygonal, hexagonal, etc. In addition, closing these composters on top using a cover is also known, in particular to avoid an odor nuisance and to keep moisture in the composter. An essential disadvantage of such composters is that the climate in the composter practically cannot be influenced from the outside. However, in particular drying out of the compost is to be avoided to ensure the most rapid possible decay of the materials to be composted. In addition, it is disadvantageous that there is not yet a satisfactory storm securing device, which holds the covers secured on the compost container in case of storm and therefore avoids damage or loss of the cover.

SUMMARY OF THE INVENTION

Proceeding from prior art of the above-described type, the invention is based on the object of providing a device for producing humus, which provides an improved decay climate in the composter and which preferably enables advantageous securing of the cover.

The invention achieves the stated object in that the drain opens into a collecting container associated with the jacket.

Via this drain, for example, collected rainwater can be added to the decaying material thereafter in a metered manner, whereby a favorable decay climate can be maintained in the compost container even over longer periods of time. In this case, this drain can optionally be metered with respect to the quantity to be introduced. In particular, however, drip metering suggests itself, to be able to provide the desired effect over the longest possible periods of time.

To increase the storage capacity of the rainwater collecting container or to avoid a wind discharge of the water, the drain opens into a collecting container held in the jacket. Essentially, this means that the rainwater collecting container relays the collected rainwater directly to the collecting container associated with the jacket and buffers it therein. To avoid the introduction of dirt into the collecting container, the drain is preferably equipped with a screen. The collecting container inlet can also be equipped with a screen, to also avoid introduction of dirt into the collecting container due to composted material when the cover is open and the compost container is being charged.

Particularly advantageous design conditions and space conditions for this moisture metering in the compost container result if the drain opens into a distributor channel and/or ring line, which is associated with the jacket and is horizontally circumferential around the jacket in the region of the composter opening. This distributor channel or ring line is optionally fastened on the jacket of the compost container or can be suspended in the composter opening. If the ring line is suspended, this has the advantage that it can be removed without problems at any time for cleaning purposes. The collecting container bottom opens into the horizontally circumferential distributor channel and/or ring line or is optionally also a part thereof. This means that the collecting container can also be circumferential in a ring shape around the container opening and is optionally provided with drain openings, which open directly into the composter interior; or the collecting container charges the circumferential distributor channel or ring line, from which the water is supplied to the decaying material as uniformly distributed as possible via the composter circumference.

For this purpose, the horizontally circumferential distributor channel and/or ring line has water drain openings, in particular water drip openings, which discharge the water in a metered manner. In addition, a water overflow can be provided, which conducts excess water out of the compost container to avoid excessive introduction into the composter, which would in turn be disadvantageous for the decay process. The horizontally circumferential distributor channel and/or ring line can also be connected to at least one water storage container and can open therein, this distributor channel and/or ring line preferably being fastened on the jacket or suspended on the compost opening. The bottom of the water storage containers can have water drip openings and/or can open into a horizontally circumferential distributor channel and/or ring line.

Particularly good distribution or introduction conditions result if a water-distributing or water-buffering fiber nonwoven material is associated with the water drain openings, in particular the water drip openings. This fiber nonwoven material distributes the water to be penetrated as uniformly as possible over a large area and therefore ensures equal distribution in the introduction or forms an enlarged evaporation area. Particularly fine metering of the introduced water is therefore possible.

In this context, it is advantageous if the jacket insists of multiple segments, which can be assembled to form the composter, and which are equipped on the interior with stiffening ribs forming a closed structure, wherein the stiffening ribs are arranged like a roof and the segment walls are equipped with passages, specifically with ventilation holes. A particularly rigid structure therefore results for the composter wall, in particular for the composter jacket, and sufficient through ventilation, which is required in addition to the water introduction for a proper decay climate, is additionally provided. In this case, the passages, i.e., the through ventilation holes, are preferably arranged so that they are each positioned directly below the stiffening ribs. This has the advantage that they practically cannot be covered by the compost material.

Particularly good through ventilation conditions result in this case in conjunction with a water-distributing or water-buffering fiber nonwoven material if this fiber nonwoven material is associated with the jacket on the inside and covers the jacket on the inside at least partially or over part of the area. It is therefore ensured that the ventilation holes are covered by the fiber nonwoven material resting on the stiffening ribs such that clean ventilation of the composter interior is possible over practically the entire area, without having to accept clogging or covering of the ventilation holes. The best possible main climate is therefore achievable using simple means.

To secure the cover, it is provided in particular that the cover is detachably fixed on the jacket by means of two adjacent wall element connecting bolts, via which in each case a gudgeon is fixed in an articulated manner as a terminus on top from the connecting securing pins of two adjacent wall segments and in particular at least one of the other corner regions of the cover. If the cover is in two parts, wherein the two parts are preferably articulated with one another via a hinge and wherein both parts are fixable on the jacket, in particular at least one of the two parts is detachably fixed on the jacket, this part being able to be opened thereafter for charging the compost container.

To make the securing of the cover as simple as possible and also be able to detach it easily, it is advantageous for the cover to be equipped with passages arranged distributed around the cover edge for fixing on the jacket, of which passages at least the passages associated with the detachable part are open toward the cover circumference. The passages which are open toward the cover circumference can be constricted in the transition region in relation to the passage diameter, to avoid undesired detachment of the securing.

For the securing, the cover is detachably fixed on the jacket by means of at least one securing pin, which engages in a jacket opening and at the same time optionally connects two adjacent wall segments. The securing pin has a geometry which overcomes the constriction and/or a clearance corresponding to the constriction width at least on one securing pin section. This securing pin section is preferably arranged at a distance to the cover side pin end, to ensure proper securing of the closed cover.

So as not have to produce such a securing pin, which is sometimes of significant length, in the extrusion method, but rather also to be able to produce it in the die casting method in small molds, it is proposed that the cover be detachably fixed on the jacket by means of at least one securing pin, which engages in a jacket opening and at the same time optionally connects two adjacent wall segments, and which comprises at least two sections having cross-shaped cross section in its longitudinal extension, which are each connected via a section having band-shaped cross section, this band-shaped section assuming the function of a spring hinge. The cross-shaped sections ensure a secure hold.

BRIEF DESCRIPTION OF THE DRAWING

The invention is schematically illustrated on the basis of an exemplary embodiment in the drawings. In the figures.

DESCRIPTION OF THE PREFERRED EMBODIMENT

Figure 1:
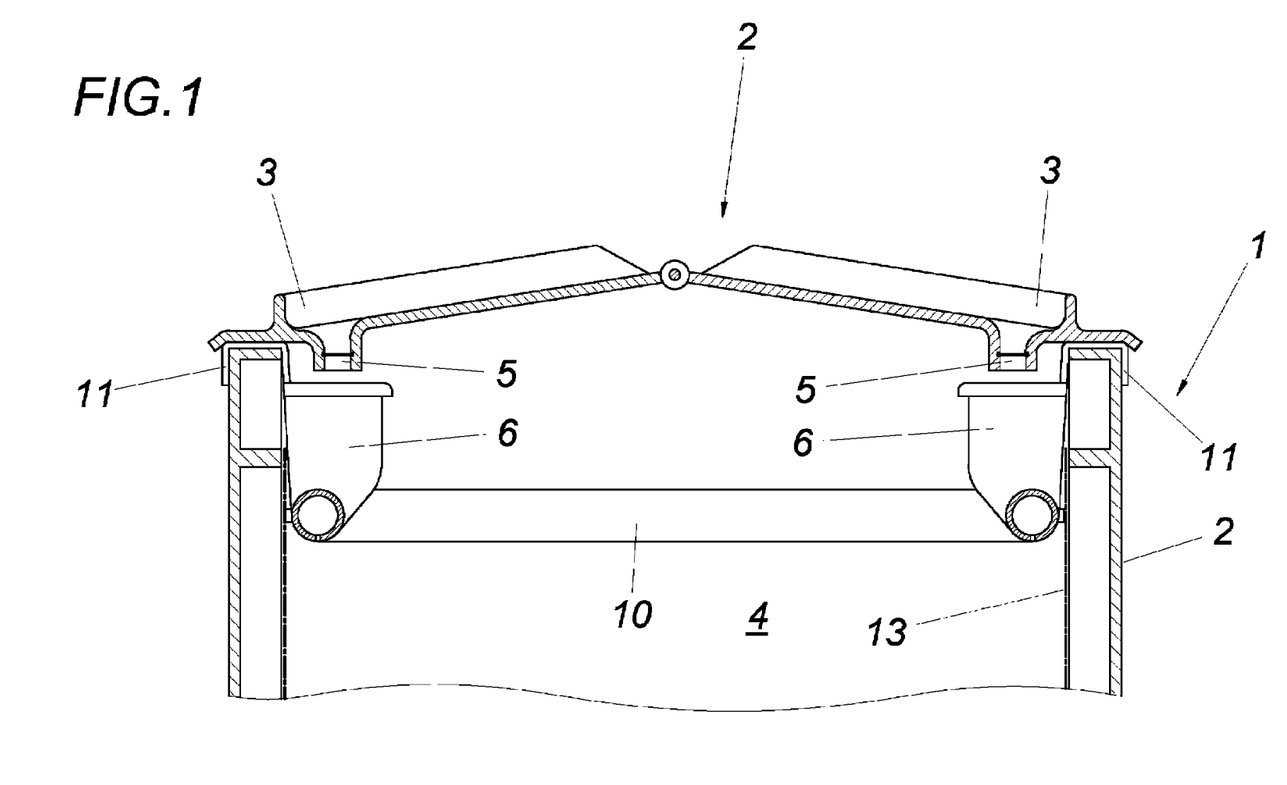
FIG. 1 shows a detail of a device according to the invention in a partially cutaway cross section.
Figure 2:
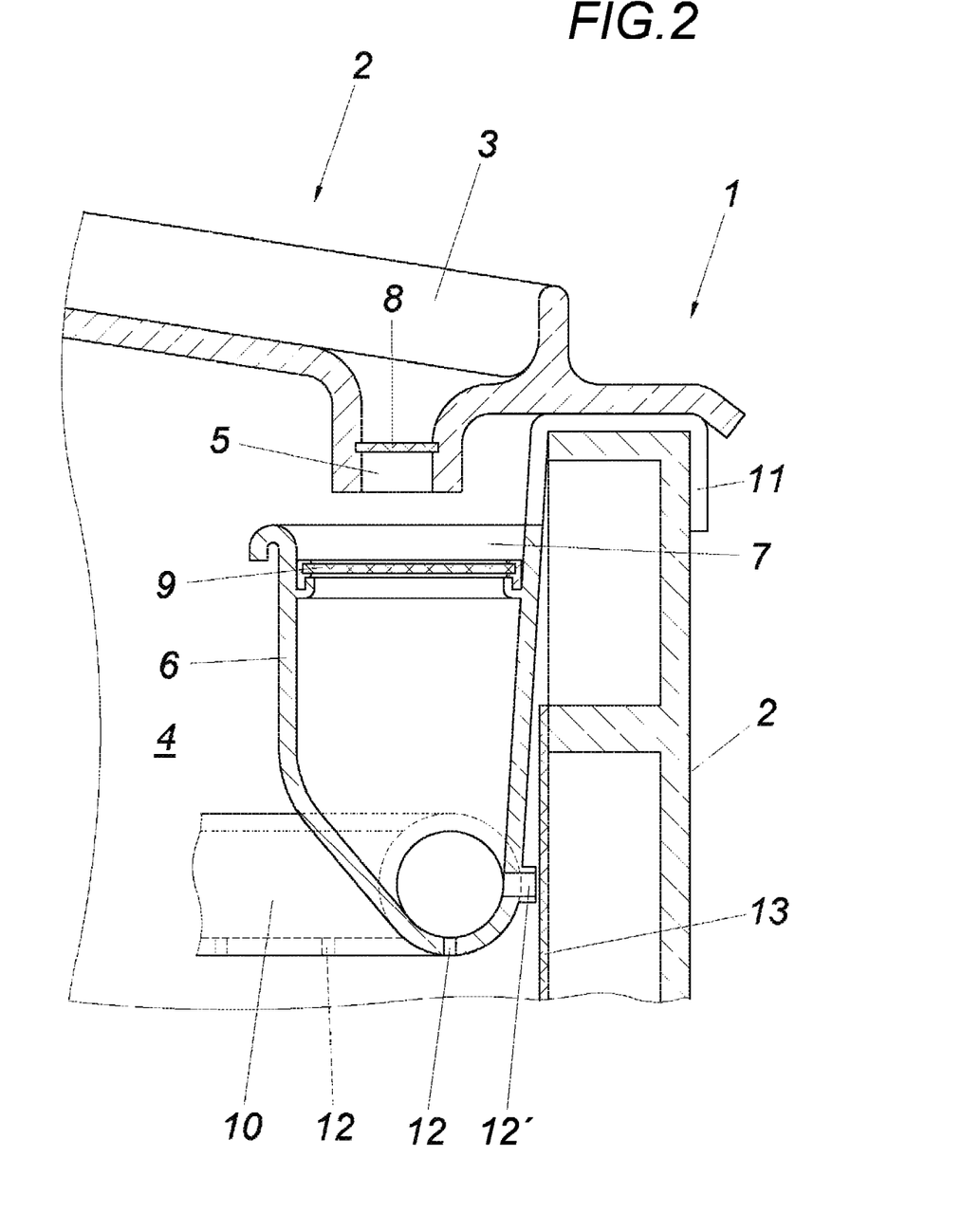
FIG. 2 shows a detail of the device from FIG. 1 in an enlarged illustration.

A device for producing humus, specifically a composter, comprises, inter alia, a compost container 1 forming a jacket, which is assembled from multiple segments arranged distributed around the circumference and which is equipped with a cover 2 which closes the compost container 1 on top. The cover 2 forms a rainwater collecting basin 3, with which at least one drain 2, which opens into the composter interior 4, is associated. The drain 5 opens into a collecting container 6 associated with the jacket 2. Both the drain 5 and also the collecting container inlet 7 are each equipped with a screen 8, 9.

The drain 5 opens into a ring line 10, which is circumferential around the jacket 2 in the region of the composter opening, this ring line being suspended on the composter opening in the exemplary embodiment shown by means of the holding attachments 11, which enclose the composter opening. The collecting container bottoms are part of the ring line 10 circumferential around the jacket in the exemplary embodiment shown. This ring line 10 has water drip openings 12, which are uniformly distributed around the circumference. A water-distributing or water-buffering fiber nonwoven material 13 is preferably associated with the water drip openings, in particular the water drain openings, this material optionally being wetted directly in front of an overflow opening 12'.

Figure 3:
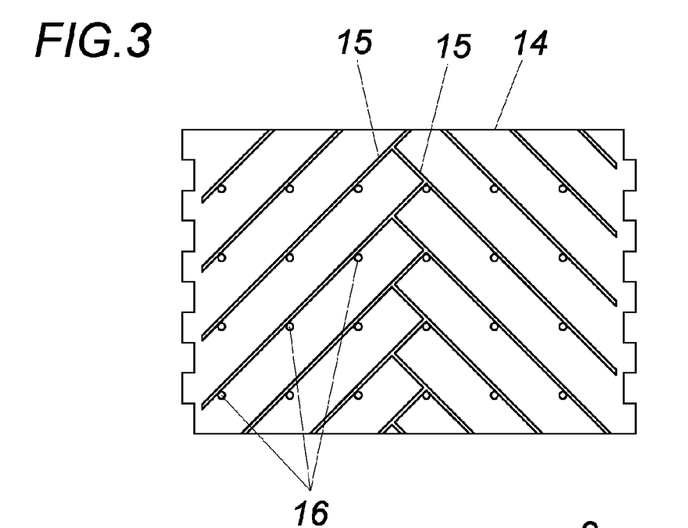
FIG. 3 shows a wall segment of a device according to the invention in an interior view.

As already mentioned, the jacket consists of multiple segments 14, which can be assembled to form the jacket, and which are equipped on the interior with stiffening ribs 15 forming a closed structure, wherein the stiffening ribs are arranged like a roof and the segment walls are equipped with passages, specifically with ventilation holes 16. The water-distributing and water-buffering fiber nonwoven material 13 is associated on the inside with just this jacket such that it covers the jacket on the interior over at least part of the area. The nonwoven material is held by the stiffening ribs 15 with spacing to the ventilation holes 16 in this case.

Figures 4, 5, 6:
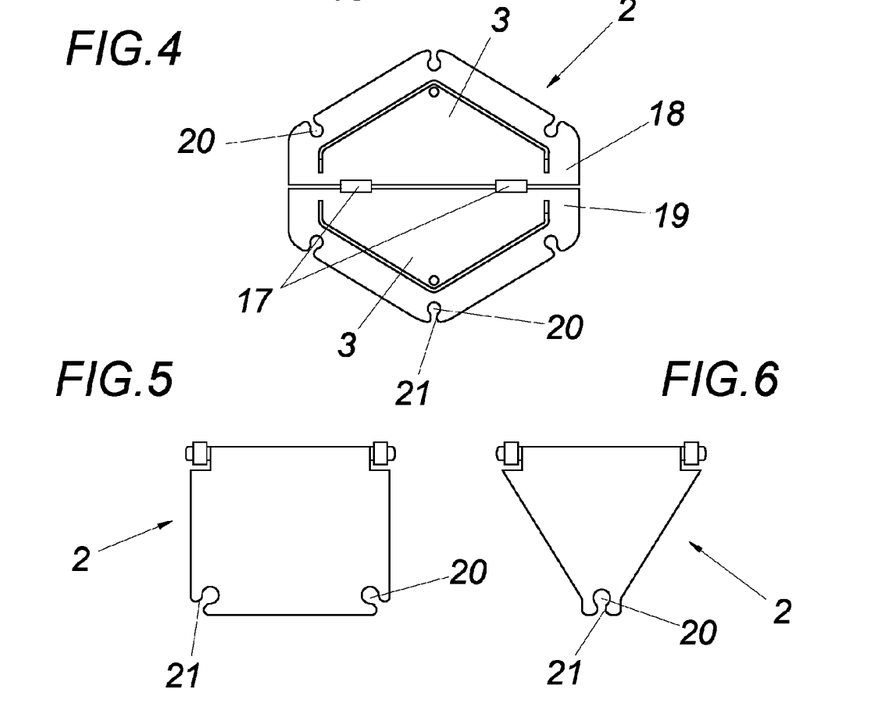
FIGS. 4-6 shows various cover variants.

FIGS. 4 to 6 show various cover variants. The cover 2 according to FIG. 4 is formed in two parts, wherein the two parts are articulated with one another via a hinge 17 and wherein both parts 18, 19 are fixable in the jacket and in particular at least one of the two parts is detachably fixed on the jacket. For this purpose, the cover 2 has passages 20 on the cover edge, of which passages 20, at least passages 20 associated with each detachable part are open toward the cover circumference. Just the passages open toward the cover circumference are constricted in the transition region in relation to the passage diameter (constriction 21).

Figure 7:
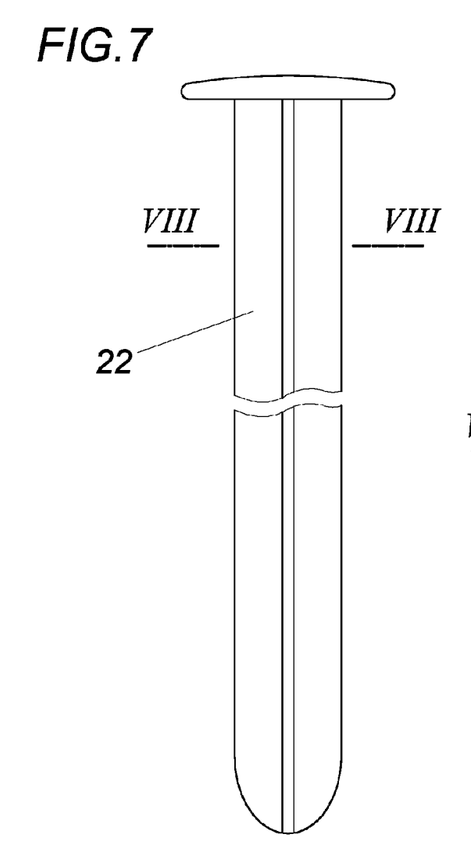
FIG. 7 shows a securing pin.
Figure 7A:
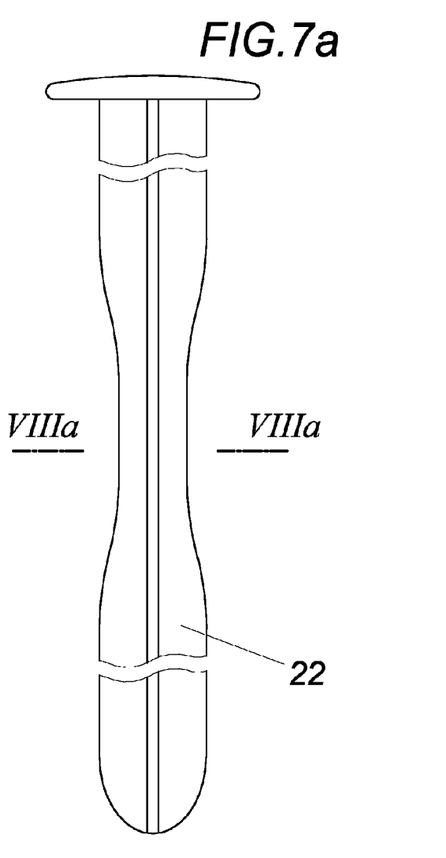
FIG. 7a shows a variant of the securing pin from FIG. 7.

FIG. 7 shows a securing pin, as can be used for connecting the wall segments 14 and for securing the cover 2. The securing pin is inserted into the passage 20 in FIG. 8. It can overcome the constriction by deformation of the securing pin 22 having cross-shaped cross section, after it has been withdrawn somewhat from the cover upper side. To be able to penetrate the passage more easily in this case, the securing pin 22 can be formed as shown in FIG. 7a.

Figure 8:
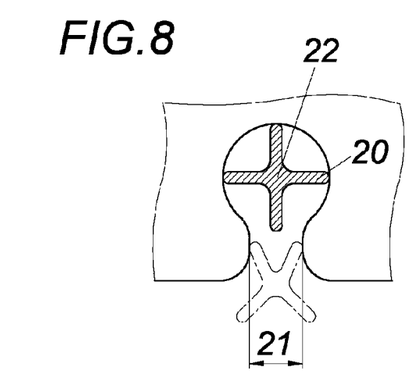
FIG. 8 shows a securing pin engaging in a passage on the cover.
Figure 8A:
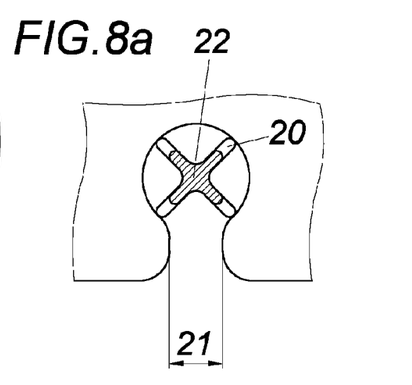
FIG. 8a shows a variant of FIG. 8 associated with FIG. 7a, FIG. 9 shows a design variant of a securing pin.
Figure 9:
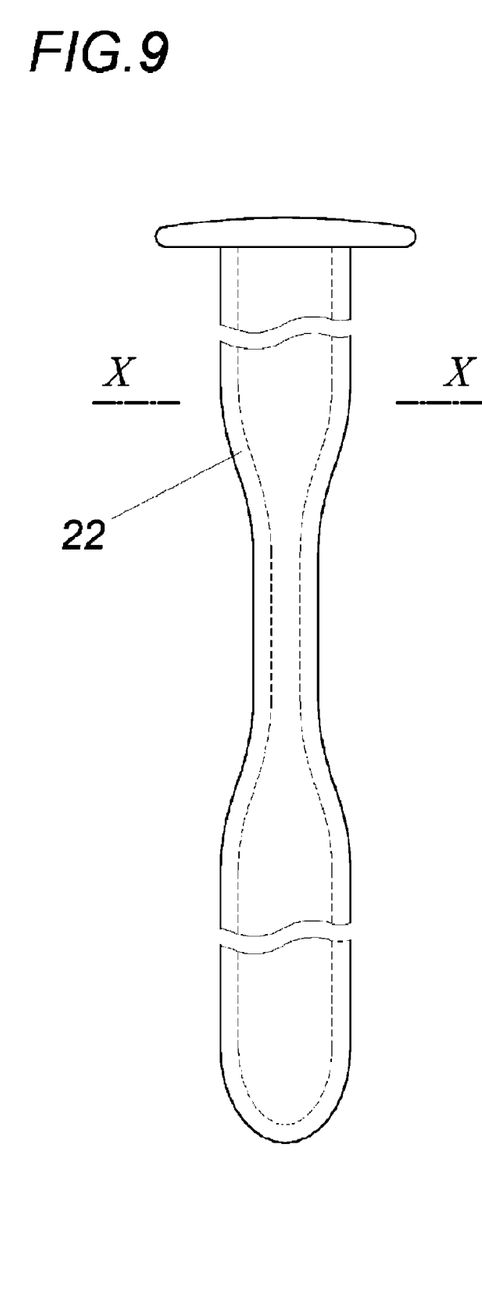
Figure 10:
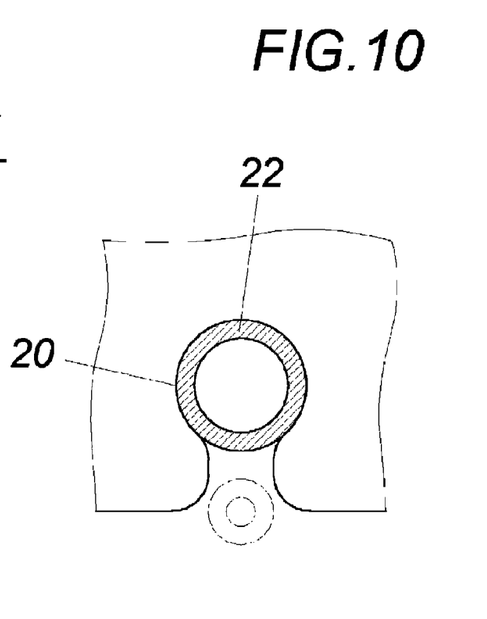
FIG. 10 shows a securing pin from FIG. 9 engaging in a cover passage.

It is indicated in FIG. 8 that the cross-shaped securing pin 22 can be rotated by 45° when it is pushed into the guides associated with it in the jacket. If the securing pin 22 is rotated by 45° after overcoming the constriction 21 during the pressing down to fix the cover 2, the rod cross section thus increases by a factor of the square root of two in relation to the constriction 21, whereby undesired opening in the event of strong wind is prevented. FIG. 8a shows how a securing pin 22 withdrawn somewhat from the cover upper side, as shown in FIG. 7a, is insertable into the passage 20. In this case, no twisting of the securing pin 22 is required because of the constricted securing pin 22.

Figures 11, 12, 13:
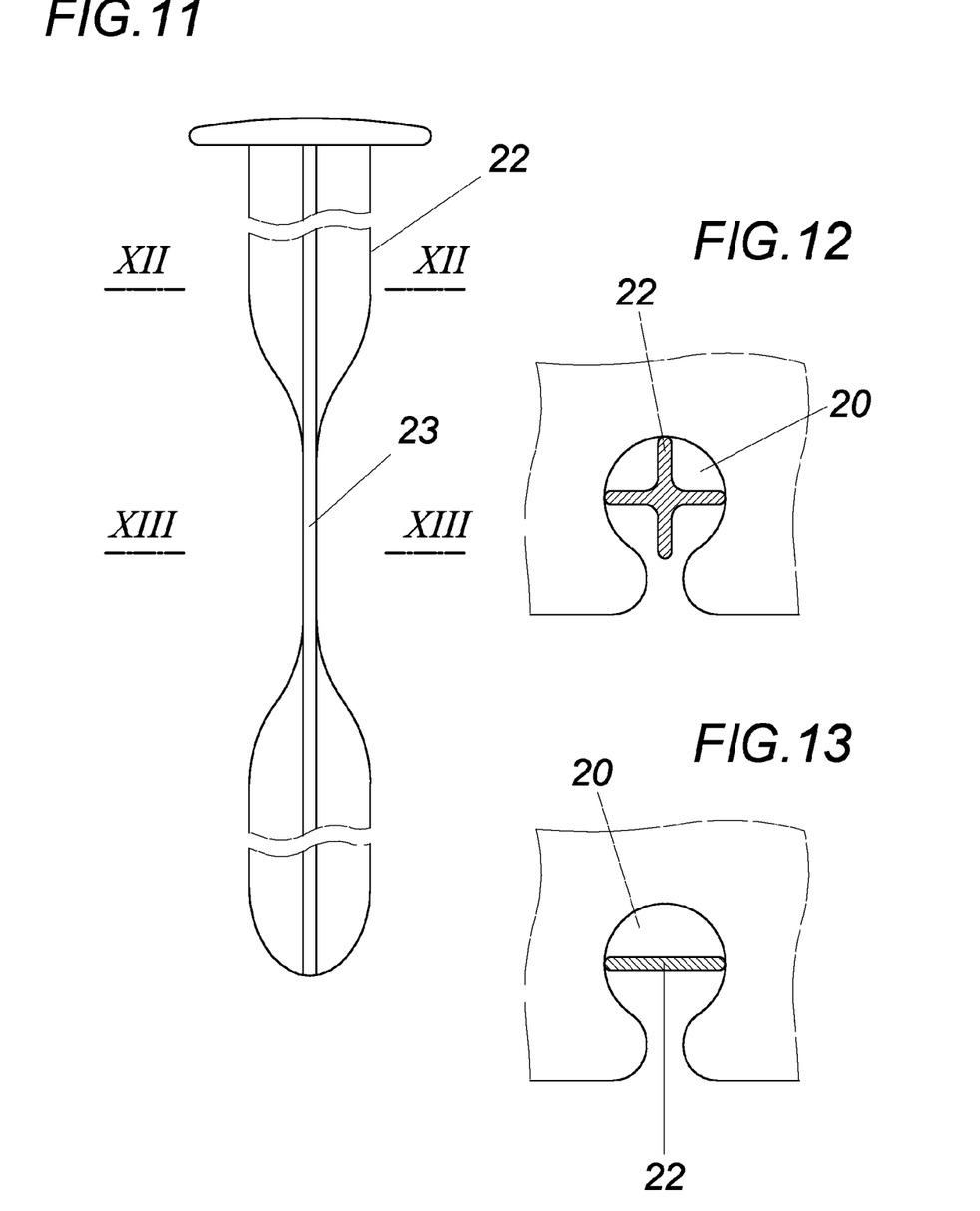
FIG. 11 shows a design variant of a securing pin according to the invention.
FIGS. 12 and 13 show the securing pin from FIG. 11 inserted into a cover passage and FIGS. 14 and 15 show a securing pin having a clamping spring attachment in a top view and in cross section.

However, the cover 2 can also be detachably fixed on the jacket by means of at least one securing pin 22, which engages in a wall jacket opening and at the same time optionally connects two adjacent wall segments, and which has a clearance at least on one securing pin section corresponding to the constriction width (FIGS. 9 to 13). The securing pin according to the exemplary embodiment according to FIGS. 11 to 13 is additionally formed such that it comprises two sections having cross-shaped cross section in its longitudinal extension, which are connected via a section having band-shaped cross section 23, this band-shaped section 23 assuming the function of a film hinge.

Figure 14:
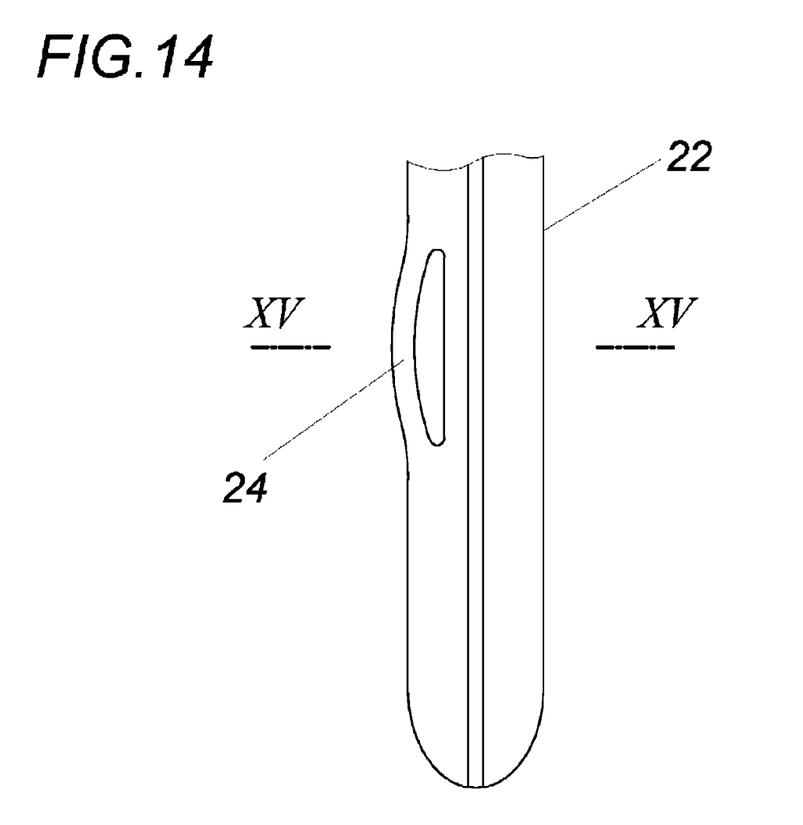
Figure 15:
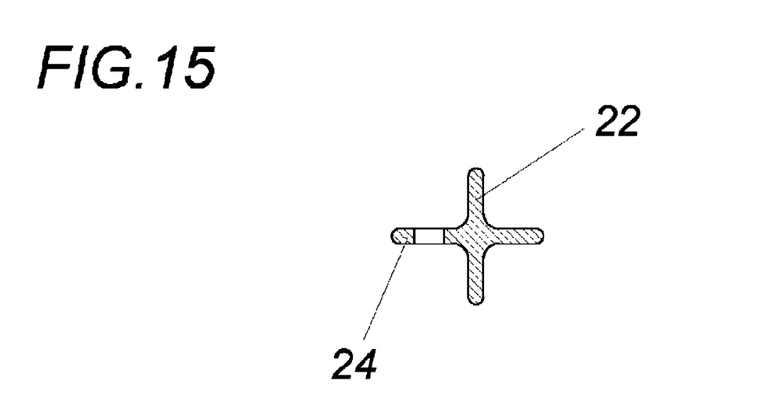
Figure 16:
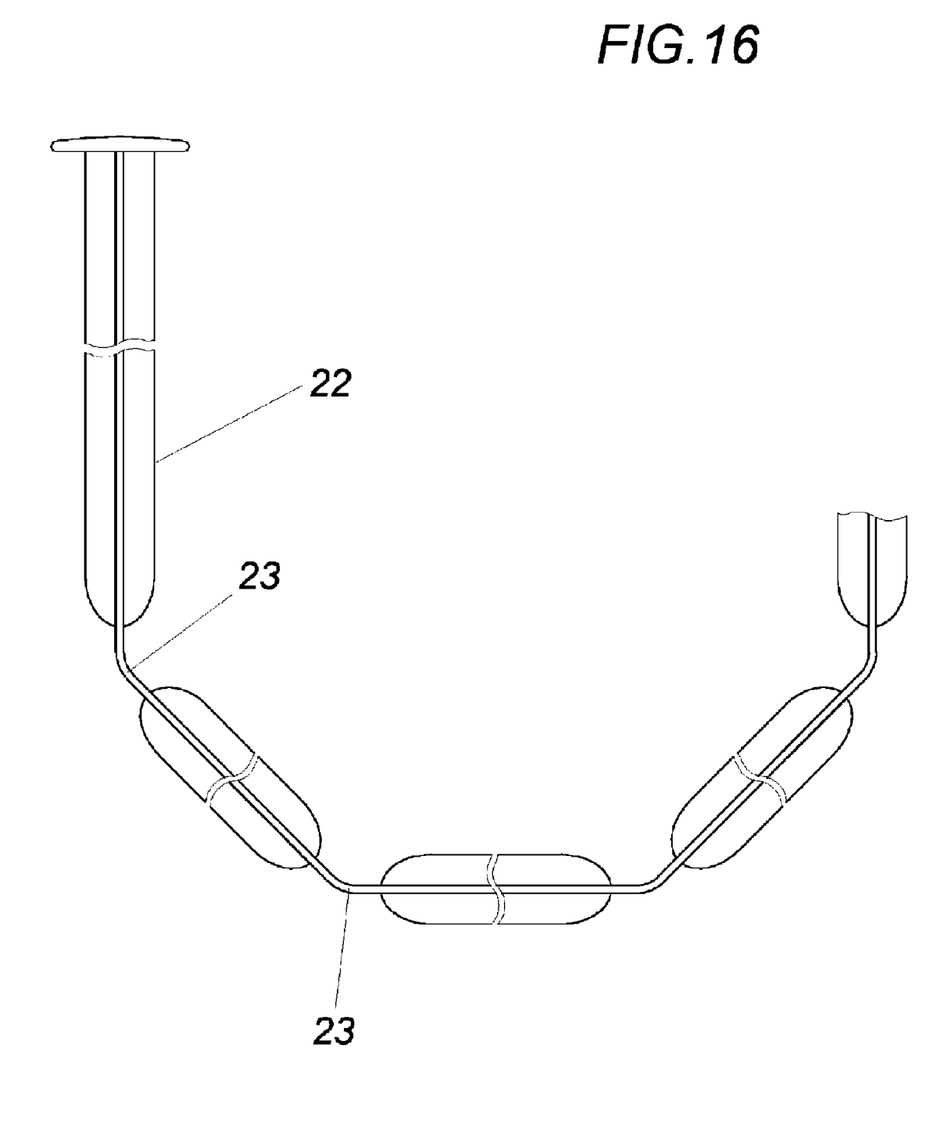
FIG. 16 shows a further variant of a securing pin according to the invention.

In the exemplary embodiment according to FIGS. 14 and 15, a springy bulge and a passage are shown in a section of a securing pin 22, this bulge forming a spring element 24, which additionally secures the pin in a respective segment 14.

The invention claimed is:

1. A device for producing humus, comprising a composter, having a compost container (1) forming a jacket, which is closed on top using a cover (2), wherein the cover (2) forms a rainwater collecting basin (3), with which at least one drain (5) opening into a composter interior (4) is associated, wherein the at least one drain (5) opens into a collecting container (6) associated with the jacket and into a distributor channel and/or ring line (10), which is associated with the jacket and is horizontally circumferential around the jacket in a region of the composter opening, said distributor channel and/or ring line being suspended on the composter opening.

2. The device according to claim 1, wherein the drain (5) is equipped with a screen (8).

3. The device according to claim 1 wherein an inlet of the collecting container is equipped with a screen (9).

4. The device according to claim 1, wherein the collecting container bottom opens into the horizontally circumferential distributor channel and/or ring line (10) and is optionally a part thereof.

5. The device according to claim 1, wherein the horizontally circumferential distributor channel and/or ring line (10) has water drain openings (12) and water overflow openings.

6. The device according to claim 5, wherein a water-distributing and water-buffering fiber nonwoven material (13) is associated with the water overflow openings 12'.

7. The device according to claim 1, wherein the jacket consists of multiple segments (14) which can be assembled to form the jacket, and which are equipped on the inside with stiffening ribs (15) forming a closed structure, wherein the stiffening ribs (15) are arranged like a roof and the segment walls are equipped with passages.

8. The device according to claim 1, wherein a water-distributing and water-buffering fiber nonwoven material (13), which covers the jacket on the inside over at least part of the area, is associated with the jacket on the inside.

9. The device according to claim 1, wherein the jacket (2) is in two parts, wherein both parts (18, 19) are articulated with one another via a hinge (17) and wherein both parts (18, 19) are fixable on the jacket and at least one of the two parts is detachably fixed on the jacket.

10. The device according to claim 9, wherein the cover (2) is equipped with passages (20) arranged distributed on the cover edge for the fixing on the cover, of which passages (20) at least the passages (20) associated with the detachable part are open toward the cover circumference.

11. The device according to claim 10, wherein the passages (20) open toward the cover circumference are constricted in the transition region in relation to the passage diameter.

12. The device according to claim 9, wherein the cover (2) is detachably fixed on the jacket by means of at least one securing pin (22), which engages in a jacket opening and at the same time optionally connects two adjacent segments (14), and which has a geometry overcoming the constriction (21) and/or a clearance corresponding to the constriction with at least on one securing pin section.

13. The device according to claim 9, wherein the cover (2) is detachably fixed on the jacket by means of at least one securing pin (22), which engages in a jacket opening and at the same time optionally connects two adjacent segments (14), and which comprises in its longitudinal extension at least two sections having cross-shaped cross section, which are each connected via a section having band-shaped cross section (23), this band-shaped cross-section (23) assuming the function of a spring hinge.

* * * * *